May 22, 1923.
H. R. GARRITSON
BASKET
Filed July 8, 1922
1,456,376
2 Sheets-Sheet 2
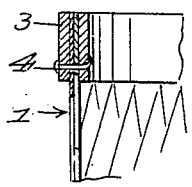
Fig. 5.
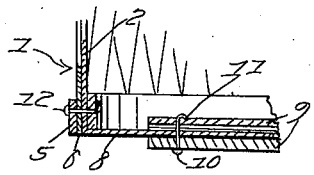
Fig. 5ª.
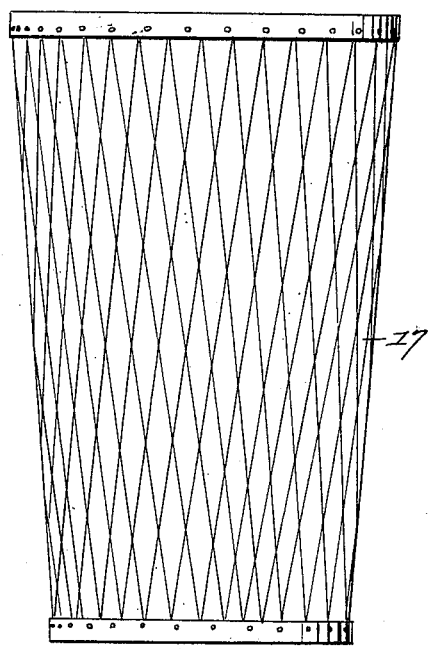
Fig. 6.
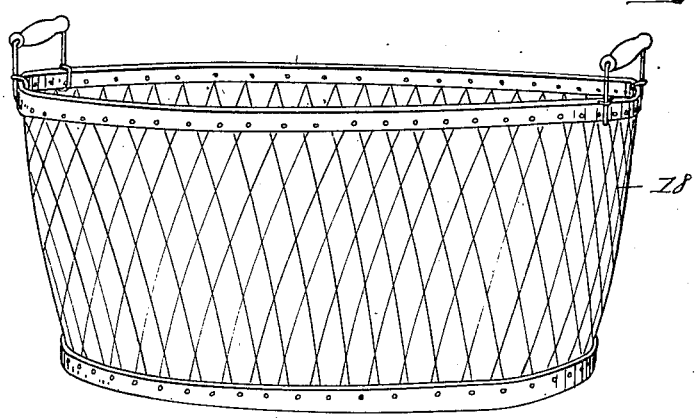
Fig. 7.
Inventor
Henry R. Garritson,
By Deane & Custer
his Attorneys.

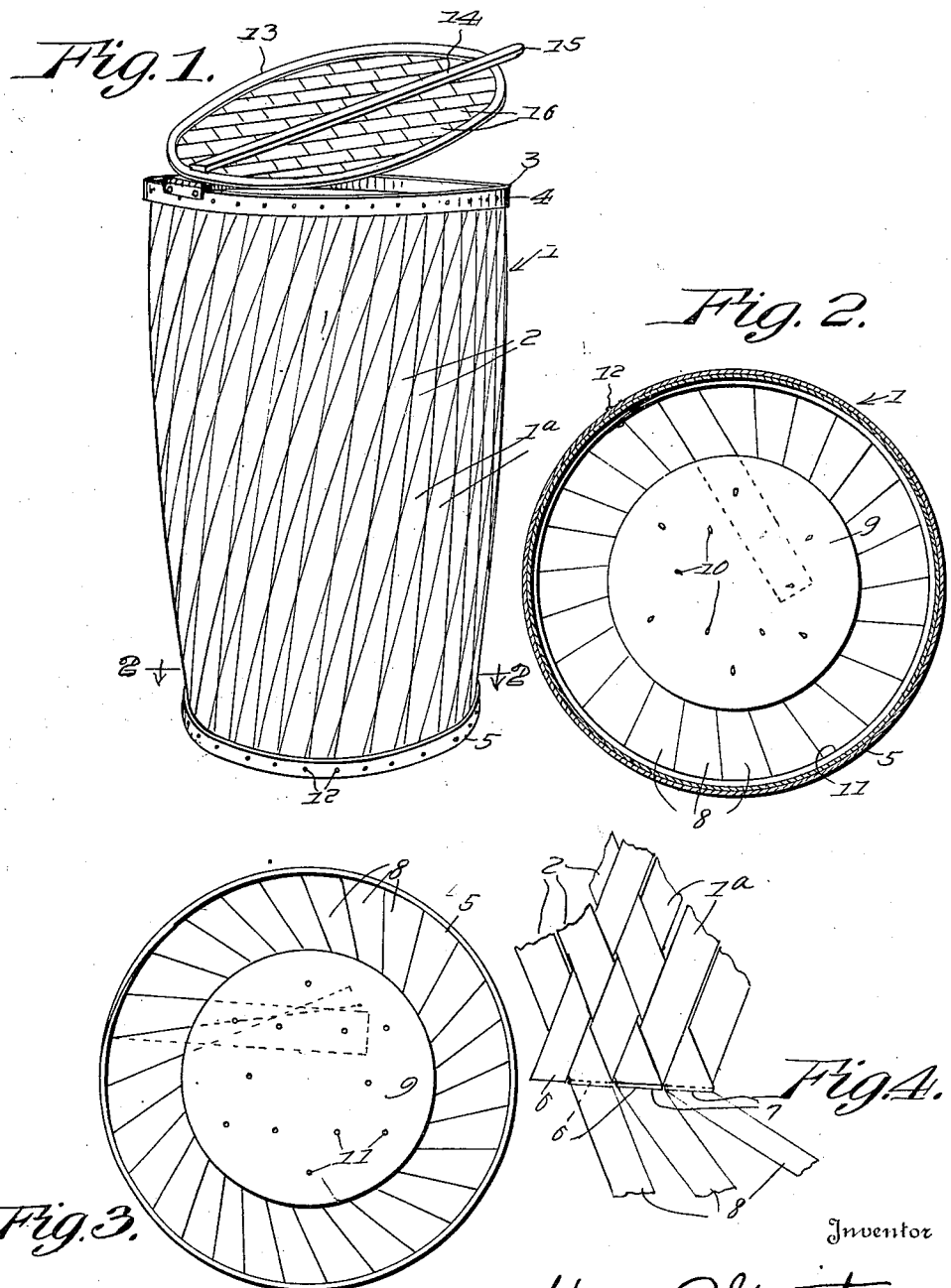

Patented May 22, 1923.

1,456,376

UNITED STATES PATENT OFFICE.

HENRY R. GARRITSON, OF KOKOMO, INDIANA.

BASKET.

Application filed July 8, 1922. Serial No. 573,580.

*To all whom it may concern:*

Be it known that I, HENRY R. GARRITSON, citizen of the United States, residing at Kokomo, in the county of Howard and State of Indiana, have invented certain new and useful Improvements in Baskets, of which the following is a specification.

This invention relates to improvements in baskets and more particularly to the type of baskets formed of woven strips of fibrous material.

The primary object of the invention is to provide an improved basket formed of long and short length strips and so constructed that the bottom formed by overlapping strips will be of substantially equal thickness throughout its extent. By forming a basket in the manner hereinafter described in detail, short length strips, which are ordinarily unfit for use, may be utilized in forming a basket.

With the foregoing objects outlined, and with other objects in view which will appear as the description proceeds, the invention consists in the novel features hereinafter described in detail, illustrated in the accompanying drawings and more particularly pointed out in the appended claims.

Referring to the drawings:

Figure 1 is a perspective view of an improved clothes hamper constructed in accordance with the invention.

Fig. 2 is a sectional view of the same taken on line 2—2 of Fig. 1.

Fig. 3 is a bottom plan view.

Fig. 4 is a detail view illustrating the manner of forming the basket.

Fig. 5 is a detail sectional view showing the manner of connecting the side strips to the top rings of the basket.

Fig. 5ª is a similar view illustrating the manner of connecting the side strips to the bottom rings, and the manner in which the strips are connected to bottom plates.

Fig. 6 is a side view of a waste basket constructed in accordance with the invention.

Fig. 7 is a perspective view of a clothes basket embodying the invention.

In the embodiment of the invention illustrated in Figs. 1 to 5ª, 1 designates the barrel or body of a clothes hamper which is formed of interwoven short strips 1ª and long strips 2.

The upper ends of the strips forming the body of the basket are connected together by rings or hoops 3 secured by nails or the like 4.

Both the short and long strips extend diagonally in opposite directions from the upper rings 3 to lower securing rings 5. The short strips as best shown in Fig. 4 terminate at the lower edge of the basket, as shown at 6, while the long strips extend beyond the lower ends of short strips and are bent on the bias as shown at 7 in order that they may form the bottom of the basket. When the long strips are bent along the lines 7, they form the main portion of the bottom of the basket and, as shown in Figs. 2 and 3, they are arranged tangentially relatively to the bottom hook or ring 5. It will be seen that the bottom extensions 8 of the long strips have their edges overlapped so that the portion of the bottom formed by said extensions 8 will be of substantially the same thickness throughout.

In order to secure the bottom extensions together and to reinforce the bottom of the basket, plates 9 are connected to the extensions 8 by means of nails or the like 10. These plates are preferably circular and they clamp the ends of the extensions 8.

An inner ring or hook 11 is preferably placed at the lower end of the body of the basket in order to reinforce the same, and this ring is connected by means of nails 12 to the outer ring 5.

The basket is preferably provided with a hinged cover 13 having a diametrically extending cross bar 14 which extends beyond the cover as shown at 15 in order to provide a handle adapted to rest on the upper edge of the basket and prevent the cover from moving into the body of the basket.

The cover 13 is also preferably formed of short strips 16 of fibrous material.

The waste basket 17 and clothes basket 18 shown in Figs. 6 and 7 are made in exact accordance with the foregoing description but are not provided with covers.

From the foregoing it will be understood that short length strips which have heretofore been wasted in the factory may be utilized for manufacturing baskets and that baskets made in accordance with this invention will be as strong as the baskets heretofore made with long strips alone.

In view of the above, it is believed that the construction and advantages may be readily understood, and it is apparent that various changes may be made in the details disclosed without departing from the spirit of the invention as expressed in the following claims.

What is claimed and desired to be secured by Letters-Patent is:

1. A basket having an annular body formed of interwoven long and short strips, all of said strips extending from the upper end to the lower end of said body, said short strips terminating at the lower end of said body, and said long strips being bent near their lower ends to provide inwardly projecting angular overlapping extensions, means for connecting said extensions together to form a bottom for the basket, and reinforcing means arranged at the upper end of said body.

2. A basket as claimed in claim 1 in which the reinforcing means at the upper end of the body consists of inner and outer rings fixedly connected to the upper ends of said strips.

3. A basket as claimed in claim 1 in which reinforcing rings are arranged at the inner and outer sides of the lower ends of the short strips.

4. A basket as claimed in claim 1 in which reinforcing plates are arranged over and under the extensions of the strips, and means connecting said plates together and to the extensions.

5. A basket as claimed in claim 1 in which the long strips are bent on the bias and said extensions are arranged tangentially to the lower end of said body.

6. A basket as claimed in claim 1 in which the body is provided with a cover having a cross bar extending diametrically across the same and provided with a projecting handle adapted to rest on the upper edge of said body.

7. A basket including an annular body formed of interwoven short and long strips, said strips being diagonally arranged and all of the short strips extending in the same direction, said short strips terminating at the lower edge of said body and said long strips having their end portions bent on the bias and extending inwardly at angles to the body to provide a bottom, the inwardly extending portions of said long strips being overlapped and arranged tangentially to the lower end of said body, bottom plates arranged above and below the inwardly extending portions of the long strips, means connecting said plates together and to the inwardly extending portions of the long strips, reinforcing rings fixedly secured to the inner and outer portion of the lower end of said body, and reinforcing rings fixedly secured to the inner and outer portion of the upper end of said body.

In testimony whereof I affix my signature.

HENRY R. GARRITSON.